United States Patent [19]

Leibach

[11] 4,099,671

[45] Jul. 11, 1978

[54] DEVICE FOR CONTROL OF AN AIRCRAFT

[75] Inventor: Heinrich Leibach, Grafrath-Wildenroth, Fed. Rep. of Germany

[73] Assignee: Motoren- und Turbinen-Union Munchen GmbH, Fed. Rep. of Germany

[21] Appl. No.: 722,771

[22] Filed: Sep. 13, 1976

[30] Foreign Application Priority Data

Sep. 11, 1975 [DE] Fed. Rep. of Germany ....... 2540537

[51] Int. Cl.² ............................................. B64C 15/04
[52] U.S. Cl. ................................................. 239/265.29
[58] Field of Search ....................... 239/265.27, 265.29, 239/265.31, 265.35, 265.25; 60/229; 244/12.2, 12.3, 12.4, 12.5, 23 A, 23 B, 23 D

[56] References Cited

U.S. PATENT DOCUMENTS

| | | | |
|---|---|---|---|
| 2,849,861 | 9/1958 | Gardiner et al. | 239/265.29 |
| 3,196,608 | 7/1965 | Tindale | 60/229 X |
| 3,280,560 | 10/1966 | Marchant et al. | 239/265.29 X |
| 3,348,380 | 10/1967 | Rees | 239/265.29 X |
| 3,833,187 | 9/1974 | Kahler et al. | 244/12.5 X |
| 3,837,411 | 9/1974 | Nash et al. | 239/265.29 X |
| 3,989,193 | 11/1976 | Vedova et al. | 239/265.35 |

FOREIGN PATENT DOCUMENTS

| | | | |
|---|---|---|---|
| 1,090,525 | 10/1960 | Fed. Rep. of Germany | 239/265.25 |
| 1,209,808 | 1/1966 | Fed. Rep. of Germany | 60/229 |

Primary Examiner—John J. Love
Attorney, Agent, or Firm—Craig & Antonelli

[57] ABSTRACT

Control apparatus for an aircraft is provided which includes a gas-controlled housing disposed downstream of a gas turbine jet propulsion supply system. A propulsion nozzle is provided at the downstream end of a tubular member extending from the control housing in alignment with a longitudinal axis of the engine system. Lateral control outlets extend in opposite lateral directions from the gas-controlled housing. The flow of gases selectively to one or both of the control outlets and to the propulsion nozzle is effected by way of two part-spherical sector control valve members which are mounted for pivotal movement about an axis running perpendicular to the longitudinal axis. The control valve members are configured for selectively blocking the flow of propulsion gases to the propulsion nozzle and the respective lateral control outlets.

14 Claims, 4 Drawing Figures

DEVICE FOR CONTROL OF AN AIRCRAFT

The present invention relates to a device for control of an aircraft, wherein the thrust jet of a gas turbine jet propulsion system is deliverable to a gas collector housing which presents lateral gas discharge openings and a propulsion nozzle disposed substantially coaxially to the extended axis of the propulsion system. Control devices are provided wherewith the flow path to the thrust nozzle or to the lateral gas discharge openings may be selectively blocked or made free. The device is rotatably borne coaxially to the extended axis of the propulsion system or on a jet conduit thereof.

Such a device is known for control of an aircraft, essentially from German Auslegeschrift No. 2,143,235, wherein the lateral gas discharge openings are opened or blocked by a tubular slide that is axially adjustable, whereby supplementary blocking valves cooperate with the axial adjustment of the tubular slide in such a way that, with an increased opening of the lateral gas discharge openings, the gas flow path to the propulsion nozzle is increasingly blocked, and vice versa.

This known solution is only essentially appropriate for control of an aircraft if the lateral gas discharge openings have supplementary flow conduits or control nozzles associated with them, which supplementary flow conduits or control nozzles cause a change in the flow-off direction of the partial gaseous flows.

Even the possibility offered by the present known solution, of making the whole device rotatable about its longitudinal axis, only leads to a higher rate of variation in control possibilities for an aircraft if the device is equipped with supplementary flow conduits or swingable control nozzles that allow a variation of the gas discharge flow direction in question.

Moreover, in the known case, control devices or actuating means for redirection of the gaseous flow, disposed centrally within the device, cause not insignificant flow losses, particularly in horizontal flight with opened flow path for the propulsion gases to the thrust nozzle.

It is further known, in principle, in thrust reversing devices for aircraft, that two shell-like jet deflector valves can be pivotably disposed in such a way that they may be folded onto each other for the operational setting, to block in common the flow path of the propulsion gases to the forward thrust nozzles, whereas in the non-operational setting they can individually block lateral gas outlets that correspond to a flow conduction grid.

Such known thrust reversal devices would accordingly be capable exclusively of imparting the desired braking effect to an aircraft.

The present invention is addressed to the problem of improving a device for aircraft control, as opposed to what is known, so that in a relatively simple way various moments, e.g. about the vertical or transverse axis, as well as vertical or short takeoff properties along with acceptable transition phases from hovering to horizontal flight, or vice versa, may be imparted to the aircraft.

Starting with a device of the above-mentioned species, preferred embodiments of the present invention are characterized by the combination of the following characteristics:

a. Within a gas collector housing there are two control valves made, in an essentially known sphere sector configuration, individually or simultaneously as a hemisphere swingable about an axis of rotation that is transverse to an extended axis of the propulsion unit, and b. the respective pipe connection of a lateral gas outlet opening, or of a tube section that leads to the thrust nozzle, is disposed symmetrically in rotation with reference to the two control valves, in such a way that the flow path to a gas outlet opening or to the thrust nozzle can be entirely blocked by means of a control valve.

These and other objects, features and advantages of the present invention will become more apparent from the following description when taken in connection with the accompanying drawing which shows, for the purposes of illustration only, a single embodiment in accordance with the present invention, and wherein.

Figure 1:
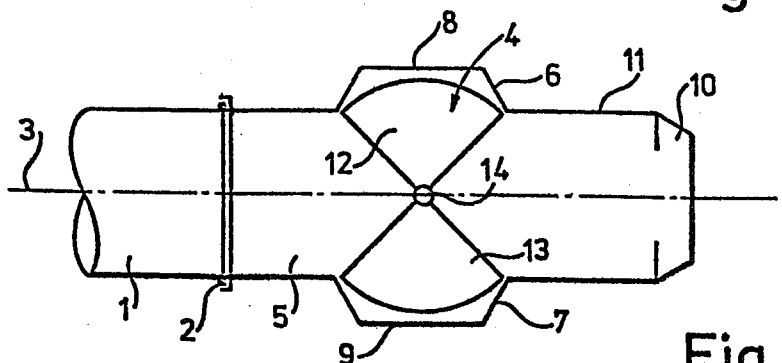
FIG. 1 is a schematic, part-sectional side view, illustrating the device of the present invention in a first control valve setting.

Referring now to the drawings, wherein like reference numerals are used throughout the various views to designate like parts, the device according to FIGS. 1 – 4 is disposed on a jet tube 1 of a gas turbine propulsion system is not further illustrated in the drawings. Tube 1 and the device of the invention are mounted via a ball bearing 2 for rotation about an extended axis 3 of the propulsion system. The device itself consists essentially of a gas collector housing 4 that is coupled via an upstream tube section 5, via ball bearing 2, with jet tube 1.

In connection with the upstream tube section 5, the gas collector housing 4 has two tube pieces 6, 7 with appurtenant lateral gas outlet openings 8, 9 that are opposite one another in a common plane.

Downstream of the two tubular pieces 6, 7 there is connected a tube secton 11 with a thrust nozzle 10, the diameter of the tube section 11 correspond to that of the upstream tube section 5.

Advantageously, the thrust nozzle 10 can be made as an adjusting thrust nozzle.

Inside the gas collector housing 4 there are also respectively two control valves in the configuration of sphere sectors, arranged to swing about a common axis of rotation 14 that runs crosswise with reference to the extended axis 3 of the propulsion system.

According to the position of FIG. 1, control valves 12, 13 block the lateral gas outlets 8, 9 completely; this is the end position of control valves 12, 13 for governing horizontal flight.

Advantageously, the control valves 12, 13 do not extend into the gaseous flow with their external end edges, whereby relatively slight flow losses are to be anticipated.

In the position according to FIG. 2, the later gas outlet opening 8 is blocked by control valve 12, and the path of the gaseous flow into tubular section 11 that leads to thrust nozzle 10 is also blocked by means of control valve 13.

Figure 2:
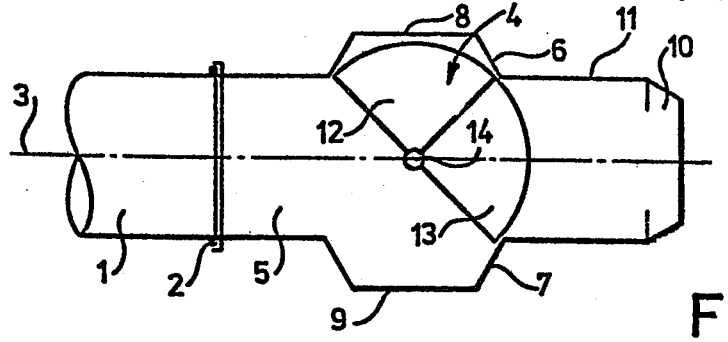
FIG. 2 is a view similar to FIG. 1, however, showing the device in a second control valve setting.

In the position of control valves 12, 13 as in FIG. 2, the vertical thrust setting may be involved or a setting in which, possibly for flight stabilizing, there may be an extra control moment exerted about the transverse axis of the aircraft.

If it is further assumed that the device will be turned from the vertical thrust setting, e.g. clockwise by 90°, and hence turned into a horizontal plane with the lateral gas outlets 8, 9, then in this situation, with unchanged position of control valves 12, 13 as in FIG. 2, there will be a lateral thrust component created that can result in a turning moment about the vertical axis of the aircraft.

Though not illustrated in the drawings, the control valves 12, 13, can be pivoted together simultaneously from the position shown in FIG. 2, by 90°, so that control valve 12 will block the gas flow path to the thrust nozzle 10 whereas the gas outlet opening 9 will be blocked by the control valve 13, so that the jet delivered from the propulsion system, e.g. to generate a downwardly directed vertical thrust moment may deviate via gas outlet 8.

Figure 3:
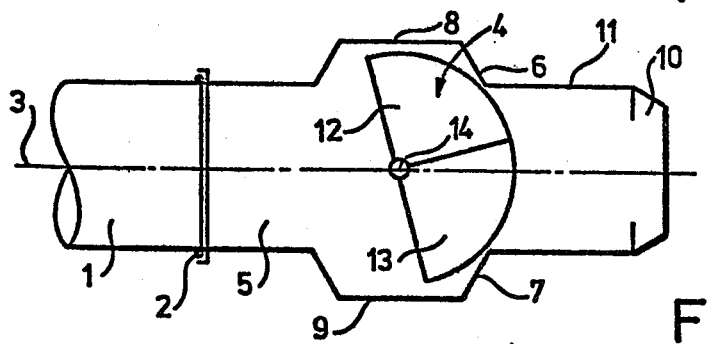
FIG. 3 is a view similar to FIG. 1, however, showing the device in a third control valve setting.

FIG. 3 illustrates a setting of the two control valves 12, 13 in which, for example, the lateral gas outlet 8 is only slightly opened and the gas outlet 9 at the same time is opened more widely than the former.

Such a setting or a similar one for the two control valves may be desirable if, for example, only slight positional stabilizing of the aircraft, just part of the available propulsion thrust is actually needed.

Figure 4:
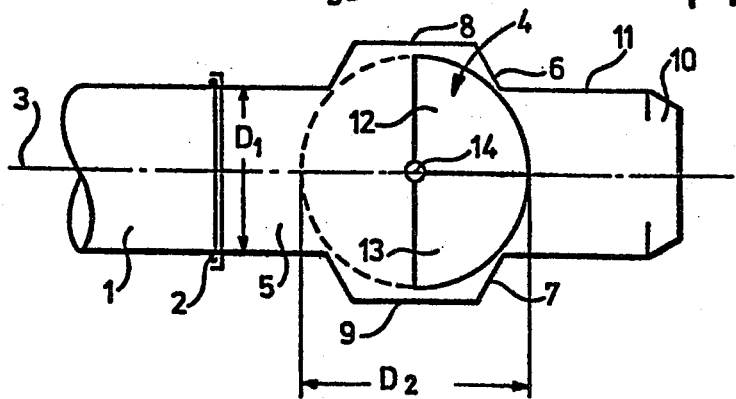
FIG. 4 is a view similar to FIG. 1, however, showing the device in a fourth control valve setting.

Finally, FIG. 4 illustrates a neutral setting of the control valves 12, 13 in which the flow path to the thrust nozzle 10 is blocked and, at the same time, both gas outlets 8 and 9 are half open, or open to the same extent, and thus no control moment is produced.

For reliable functioning of the device of FIGS. 1 to 4, it is also basic that the gas outlet areas provided by the two control valves 12, 13 always remain constant, whereby the flow cross section presented by the upstream tube section 5 will approximately correspond to that of a lateral gas outlet opening 8, 9.

Advantageously, in the device of the present invention an imaginary sphere diameter $D_2$ of the two control valves 12, 13 will be about 1.48 times greater than tube diameter $D_1$ (FIG. 4).

For a transitional phase from vertical to horizontal flight, hence from the setting of FIG. 2, for instance, to a setting of control valve 13, according to FIG. 1, it would be advantageous that the swinging of control valve 13 would be coordinated with an adjustment of the effective gas outlet area of thrust nozzle 10, with a further increase the gas outlet flow of the valve as the opening of the exhaust gas flow to the thrust nozzle 10 increases.

There could be packings (not shown) between the control valve surfaces and the corresponding counter surfaces of the gas collector housing 4.

Besides, with the device of FIGS. 1 to 4, lateral or vertical control can be obtained simply by appropriate regulation of the gas mass throughputs by means of the control valves 12, 13, swingable simultaneously as a hemisphere, without a need for supplementary conduits or swingable control nozzles to vary the direction of gas discharge.

The swinging of control valves 12, 13 can be effected, for example, by means of hydraulically or pneumatically actuated setting cylinders whose piston rods engage control valves 12, 13 via pull or push rods, possibly individually, and for swinging of control valves 12, 13 as a hemisphere these rods can also be simultaneously drivable or actuatable hydraulically or pneumatically.

The invention can be utilized in a two-stream or circuit or multi-circuit propulsion systems with a high auxiliary flow or by pass ratio relationship whose fan air flow or flows is/are vectorially deflectable via swingable blade grids or the like, e.g. for vertical or short takeoff, whereby the energy still available in the exhaust gases of the gas turbine propulsion system (inner circuit) can be drawn on by means of the device of the invention for supplemental control or stabilizing of the aircraft and for propulsion generation in cruising.

This does not exclude vectorial deflection in the indicated sense, of one or more fan air jets or a mixed flow of fan air and exhaust, by means of the device of the invention.

I claim:
1. Control apparatus for an aircraft comprising:
   a gas control housing disposed downstream of a means for supplying jet propulsion gases thereto,
   propulsion nozzle means disposed on the downstream end of said control housing in alignment with a longitudinal axis through said control housing,
   lateral control outlet means extending laterally from said gas control housing at respective opposite lateral sides thereof, and
   two control valve members, each swingable about an axis running cross-wise to said longitudinal axis,
   (i) one of said control valve members being configured and controllable to selectively block totally the flow of propulsion gases to said propulsion nozzle means, and
   (ii) said control valve members being configured and controllable together to selectively block totally the flow of propulsion gases to said propulsion nozzle means and simultaneously to selectively block at least partially the flow of propulsion gases to at least one of said lateral control outlet means,
   whereby steering of said aircraft may be effected by the selective change in flow direction of said propulsion gases.

2. Apparatus according to claim 1, wherein said lateral control outlet means are formed as tubular members extending from the control housing.

3. Apparatus according to claim 2, wherein said propulsion nozzle means is disposed on a further tubular member extending from said control housing, the openings to all of said tubular members being rotationally symmetric to said control valve members.

4. Apparatus according to claim 3, further comprising means for rotating said control housing about the longitudinal axis along with the valve members, control outlet means, and propulsion nozzle means.

5. Apparatus according to claim 1, wherein said propulsion nozzle means is disposed on a further tubular member extending from said control housing, the openings to all of said tubular members being rotationally symmetric to said control valve members.

6. Apparatus according to claim 1, further comprising means for rotating said control housing about the longitudinal axis along with the valve members, control outlet means, and propulsion nozzle means.

7. Apparatus according to claim 1, wherein each of said control valve members is configured as a spherical sector.

8. Apparatus according to claim 7, wherein the diameter of the sphere that would be formed by said control valve members is about 1.48 times the diameter of the tubular member leading to the propulsion nozzle means.

9. Apparatus according to claim 3, wherein each of said control valve members is configured as a spherical sector.

10. Apparatus according to claim 7, wherein said control valve members are swingable individually, while configured as individual sectors of a sphere, and are swingable simultaneously, while configured together as a hemisphere.

11. Apparatus according to claim 1, wherein the other of said control valve members is configured and controllable to selectively block totally the flow of propulsion gases to one of said lateral control outlet means.

12. Apparatus according to claim 9, wherein the diameter of the sphere that would be formed by said control valve members is about 1.48 times the diameter of the tubular member leading to the propulsion nozzle means.

13. A device for the control of an aircraft comprising: a gas turbine jet propulsion system, a propulsion jet tube extending along the axis of said propulsion system, lateral gas outlet openings in said propulsion jet tube, a propulsion thrust nozzle that is disposed substantially coaxially with the extended axis of said propulsion system, a gas control housing disposed in the flow path of said propulsion jet tube leading to said thrust nozzle, two control valves being configured as sectors of a sphere and being disposed in said gas control housing, said control valves being swingable about an axis of rotation running crosswise with reference to the extended axis of said propulsion system, each of said control valves being configured and controllable for selectively blocking totally the flow path to said propulsion thrust nozzle, and said control valves being controllable together for selectively blocking
   (i) totally the flow path to said propulsion thrust nozzle and
   (ii) simultaneously partially the flow path to one of said lateral gas outlet openings.

14. A device for the control of an aircraft according to claim 13, wherein said control valves are swingable individually, while configured as individual sectors of a sphere, and are swingable simultaneously, while configured together as a hemisphere.

* * * * *